Dec. 12, 1950     H. D. WILDE     2,534,092
METHOD FOR CATALYTIC REACTIONS
Filed Aug. 21, 1948
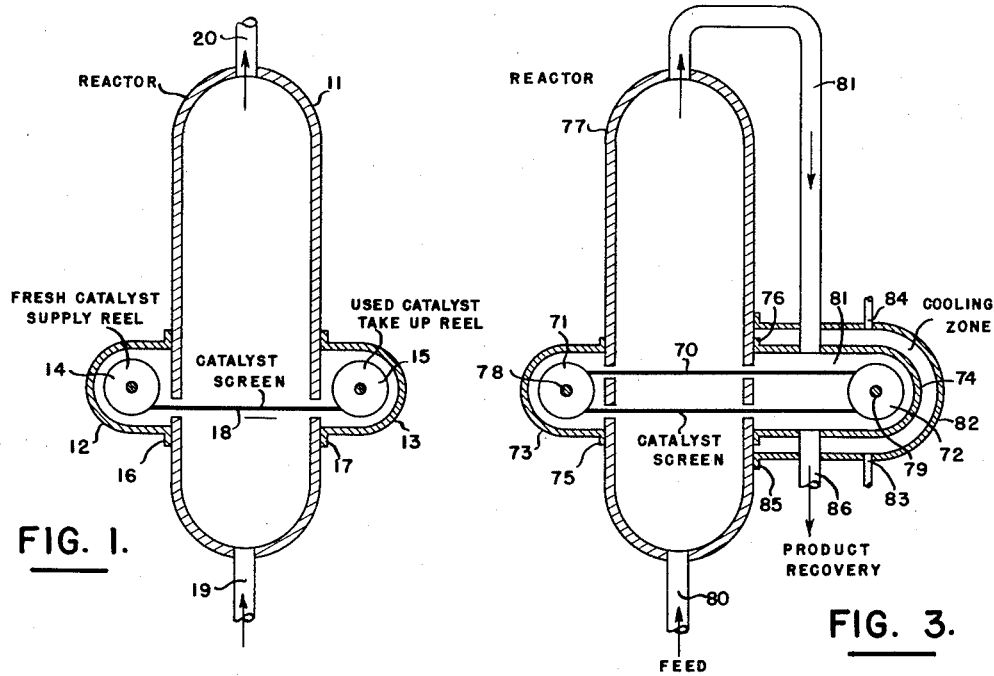
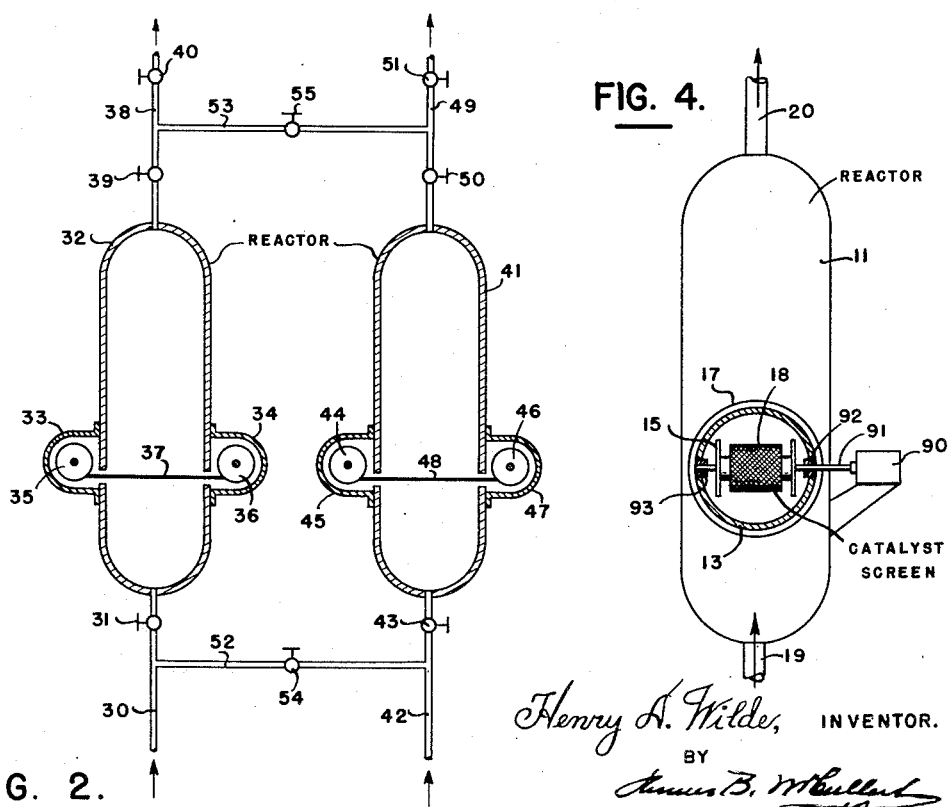
Henry D. Wilde, INVENTOR.
BY
AGENT.

Patented Dec. 12, 1950

2,534,092

UNITED STATES PATENT OFFICE 2,534,092

METHOD FOR CATALYTIC REACTIONS

Henry D. Wilde, Houston, Tex., assignor, by mesne assignments, to Standard Oil Development Company, Elizabeth, N. J., a corporation of Delaware Application August 21, 1948, Serial No. 45,526

1 Claim. (Cl. 23—1)

The present invention is directed to a method for conducting catalytic reactions. More particularly, the invention is concerned with a method in which a catalytic reaction is conducted and in which a very short contact time is required.

Prior to the present invention, it has been known to conduct catalytic reactions such as oxidation, hydrogenation, dehydrogenation, synthesis of hydrocarbons and ammonia, oxidation of ammonia, alcohols, organic acids, and the like in the presence of a catalytic material comprising a finely divided surface such as a wire mesh or gauze composed of a catalytic material or on which a catalytic material has been deposited. The prior art methods are disadvantageous in that the gauze is in a fixed position and is subjected to elevated temperatures during the catalytic reaction which causes distortion or destruction of the finely divided gauze or wire mesh or, in the case where volatilizable catalysts are deposited thereon, rapid loss of the catalyst from the surface due to its volatility. Renewal or replacement of the gauze or the catalytic material necessitates shutting down the reaction equipment.

The catalytic reactions of the type mentioned above proceed very rapidly and contact times in the neighborhood of about 0.0001 to about 0.1 of a second are sufficient to complete the reaction. If the catalytic surface is allowed to remain in contact with the reaction product, there is danger of deleterious side reaction products forming. Consequently, it is necessary that either the product or the catalyst be rapidly removed from the reaction scene. The provision of a catalyst in the form of a finely divided wire mesh or as a gauze allows the feed to pass rapidly through the catalytic scene and the product to be removed rapidly therefrom.

In accordance with the present invention, the disadvantages of the prior art are substantially eliminated by providing a method in which a finely divided wire mesh or gauze embodying a catalytic surface or on which a catalytic material has been deposited is moved through a reaction chamber in which reactions of the aforementioned types are conducted and removed from the scene of reaction to allow regeneration of the catalytic surface or renewal thereof.

It is, therefore, the main object of the present invention to provide a catalytic process in which a catalyst is contacted with a body of reaction material under conditions including a very short reaction time.

Another object of the present invention is to provide a method of continuously maintaining a catalytic surface in contact with a reactant mass for a very short time and continuously removing the catalytic surface theerfrom.

Another object of the present invention is to provide a catalytic process in which a reactant mass is contacted with a catalyst for a short reaction time to produce a product, the catalyst removed from the reaction scene and renewed, and the product recovered.

The objects of the present invention may be achieved by forming a feed mixture, passing the feed mixture in contact with a moving continuous surface of a finely divided catalytic material to obtain a contact time in the range of 0.0001 to 0.1 of a second, removing product therefrom, and recovering the desired reaction product.

The invention may be described briefly as involving the passage of a heated reaction stream into contact with a foraminate member such as a screen or wire gauze involving a catalytic surface for a time in the range given, removing reaction product from the catalytic surface, and recovering therefrom unreacted feed and reaction products.

The essential feature of the invention is the contacting of the feed material with a continuous surface embodying fresh catalytic material. This is accomplished by maintaining a foraminate member such as a wire gauze on a reel adjacent the reaction zone, unreeling the wire gauze and passing it in and through the scene of reaction to provide a catalytic surface, the catalytic gauze being continuously reeled on a take-up reel adjacent to but removed from the reaction zone and, thus, made suitable for reactivatio or renewal in a zone outside the reaction zone to provide a fresh catalyst at all times.

The objects of the present invention will be further illustrated by reference to the drawing in which—

Figure 1 is a side view in section of apparatus embodying the principles of the present invention;

Fig. 2 presents an arrangement of two reactors as described in Fig. 1 with the manifolding equipment necessary for conducting the reaction in a continuous manner;

Fig. 3 is a sectional view of apparatus in accordance with the present invention and a description thereof of a method of conducting the same in which a volatilizable catalyst is employed and recovered; and Fig. 4 is a partial sectional view of the apparatus described in Fig. 1 rotated 90° and showing the catalyst reel and prime mover therefor.

Referring to the drawing and specifically to Fig. 1, numeral 11 designates a reaction chamber providing with housings 12 and 13 enclosing, respectively, fresh catalyst supply reel 14 and used catalyst takeup reel 15. Housings 12 and 13 are attached securely to reactor 11 by gas-tight flanges 16 and 17. These flanges are so arranged to allow removal of housings 12 and 13 for servicing of the catalyst screen which will be described in more detail. Reeled on reels 14 and 15 is a catalyst screen 18 which may be constructed of a catalytic material such as silver, nickel, platinum, iron, alloy steel, molybdenum, tungsten, or palladium and the like. Materials of this nature may be used merely as a supporting material and the screens constructed thereof and metals such as aluminum, palladium, nickel, copper, molybdenum, tungsten, vanadium, and platinum deposited thereon to serve as the catalyst as the metals or compounds thereof. Compounds of the several metals mentioned such as the halides, oxides, sulfides, carbonyls, or mixtures thereof with the metals may be used as the catalyst in the present invention. The gauze or screen 18 should be so constructed to have mesh openings from about 30 to about 200 per linear inch and may be woven of wire having diameters of about 0.005 of an inch to about 0.001 of an inch.

The reels 14 and 15 are actuated by a prime mover, not shown in this figure but which will be described further.

The reactor 11 is provided with an inlet conduit 19 for introduction of a feed mixture thereto and an outlet conduit 20 for removal of reaction products and unreacted feed. The inlet 19 is suitably connected to a source of heat and a source of feed, not shown, such that the feed mixture may be introduced into the reactor 11 by inlet 19 at a suitable elevated temperature in the range between 200° and 2000° F. Likewise, the outlet 20 may be connected to cooling equipment and to product recovery facilities, not shown for simplification of the description.

Referring now to Fig. 2, an embodiment and mode of operation therefor is described in which a plurality of reactors is provided. For purposes of description, it will be assumed that a hydrocarbon feed including olefins is to be hydrogenated in the presence of a catalytic metallic screen including a nickel compound. The hydrocarbon mixture including olefins in admixture with hydrogen is introduced into the system by line 30 controlled by valve 31 which introduces the feed mixture into reactor vessel 32. Reactor vessel 32 is similar to reactor 11 described in Fig. 1, and is provided with housings 33 and 34 enclosing a fresh catalyst supply reel 35 and a used catalyst takeup reel 36. The catalyst is unreeled from reel 35 onto reel 36, the catalyst screen 37 being made available in reactor 32 as shown for contact with the hydrocarbons to be hydrogenated. A mixture of heated hydrocarbon at a temperature in the range between 200° to 800° F. and hydrogen is introduced by line 30 into reactor 32 and contacts catalyst screen 37 which thereby causes the olefins contained therein to be hydrogenated to substantially saturated products. The reaction products comprising substantially saturated material issue from reactor 32 by line 38 controlled by valves 39 and 40. Line 38 may be connected to a cooling and recovery system, not shown, for recovery of the desirable saturated products and unreacted hydrogen for recycling to the process.

A second reactor 41, which is similar to reactor 32, is also provided. This reactor 41 allows the operation to be conducted on a continuous basis. For example, when the catalyst screen 37 has been substantially completely unreeled from the fresh supply reel 37 onto the takeup reel 36, it will be desirable to discontinue feeding the hydrocarbon and hydrogen mixture to the reactor 32 and to route it to the reactor 41. Under these conditions, the feed mixture is then introduced into reactor 41 by line 42 controlled by valve 43 with fresh catalyst screen being unrolled from fresh catalyst supply reel 44 which is enclosed in housing 45, the catalyst screen being unreeled from reel 44 onto takeup reel 46 which is housed in housing 47. After the feed mixture of olefins and hydrogen in a heated condition in the temperature range given passes into contact with the catalyst screen 48, it becomes hydrogenated to substantially saturated material and issues from reactor 41 through line 49 which is controlled by valves 50 and 51. Similar to line 38, line 49 connects to a cooling and product recovery system, not shown.

The used catalyst screen on takeup reel 36 may be reactivated by passing air, hydrogen, or other reactivating gas depending on the catalyst employed at an elevated temperature in contact with the catalyst screen 37 as it is unreeled from takeup reel 36 to fresh catalyst supply reel 35, the regeneration reaction causing consumption of contaminating matter and organic material which may have become deposited on the screen 37 during the reaction. The products of the regeneration reaction pass outwardly through line 38 controlled by valves 39 and 40, this line having been disconnected from the cooling and recovery system, not shown, to allow discharge of the combustion products from the system.

The embodiment and mode of operation therefor is subject to numerous variations. For example, by providing manifolds 52 and 53 controlled, respectively, by valves 54 and 55, it is possible to operate the system with the two reactors 32 and 41 in parallel or in series as may be desired. For example, when operating in parallel, it will be apparent that the feed mixture may be routed simultaneously to both reactors 32 and 41 by either line 30 or 42 or by any one of them by manipulation of valve 54 in manifold 52. Similarly, reaction products may issue from the reactors 32 and 41 to the product cooling and recovery system by lines 38 and 49 or by either of them by manipulation of wave 55 in manifold 53.

When operating in series the feed mixture may be introduced by line 30 controlled by valve 31 into reactor 32 and thence by valve 39 in manifold 53, valve 55, line 49 and valve 50 to reactor 41 with the product issuing therefrom by valve 43 and line 42, the valves 40, 51, and 54 being closed.

When operating in either series or parallel, it will be apparent to the skilled worker that either reactor 32 or 41 may be taken out of the system by manipulation of the proper valves in the several inlet and outlet lines and the manifolds and the catalyst screens 37 or 48, as the case may be, subjected to regeneration or renewal.

Referring now to Fig. 3, an apparatus and a mode of operation therefor will now be described in accordance with the present invention in which a volatilizable catalyst is employed. For purposes of illustration, it will be assumed in describing the embodiment of Fig. 3 that a volatilizable material is employed as the catalyst, such as one of the types of the carbonyls of nickel or iron or other volatilizable material such as silver or the halides of either aluminum, iron, or nickel and the like. Reactions that may be catalyzed by catalysts of these types mentioned include reaction of methane with carbon monoxide and the higher paraffin hydrocarbons to form oxygenated derivatives thereof. The synthesis of hydrocarbons from carbon monoxide and hydrogen may also be obtained employing the apparatus and method of operation described with reference to Fig. 3. For purposes of illustration, it will be assumed that an aluminum halide catalyst such as aluminum chloride or bromide has been deposited on a continuous catalyst screen 70 which is shown as a moving belt of metallic gauze on rollers 71 and 72 enclosed in housings 73 and 74. Housings 73 and 74 are attached by gas-tight flanges 75 and 76 to a reactor 77. Rollers 71 and 72 are actuated by prime movers, not shown, through shafts 78 and 79.

The catalyst screen 70 is constructed of a durable metal capable of withstanding elevated temperatures and sudden changes in temperature and is located in the reactor 77 in the position shown. Assuming that screen 70 has a catalytic amount of aluminum halide deposited thereon, a mixture of carbon monoxide and hydrogen at a temperature in the range from about 200° to about 1000° F. is injected into the system by way of line 80 from a source not shown. Depending on the pressure and the temperature selected and the catalyst employed, either methanol or hydrocarbons may be produced. For example, pressures from about 1 atmosphere or less up to about 800 atmospheres may be used at a temperature in the range given. The mixture of carbon monoxide and hydrogen passes upwardly and through the catalyst screen on which the catalytic material has been deposited and is in contact with the catalyst for only a short period of time, the catalyst moving at all times by actuation of the rollers 71 and 72 by prime movers connected to shafts 78 and 79. This causes a fresh catalytic surface to be presented to the incoming feed at all times. Since a catalyst of the nature of the carbonyls and halides is volatile at a temperature in the range given, the catalyst may be removed rapidly from the catalyst screen and lost from the metallic surface with the products and the unreacted material issuing from reactor 77 by line 81. To recover valuable catalyst and also to provide a fresh catalytic surface at all times the reaction products and unreacted material carrying volatilized catalyst are routed into a cool zone designated by numeral 81 and enclosed by housing 74. This cool zone is provided by jacketing the housing 74 with a jacket 82 through which a cooling fluid may be circulated in the space between the housing 74 and the jacket 82. The cool fluid may be introduced through inlet 83 and removed from the space between jacket 82 and housing 74 by outlet 84. The jacket 82 is fluid tight and is attached to the reactor 77 by removable flange 85. Thus, as the reaction products, unreacted material, and volatilized catalyst pass through the cool zone 81, the temperature is rapidly reduced to a temperature in the range between 200° and 400° F. and the catalytic material deposited on the catalyst screen continuously exposed to the flow of gaseous and vaporous material passing over it. Products of the reaction including unreacted material from which the volatized catalyst has been removed discharge by line 86 to a recovery system not shown.

It will thus be seen that the apparatus and mode of operation thereof described with reference to Fig. 3 allows the presentation of a constantly renewed catalyst surface when employing a volatilizable catalyst in accordance with the present invention.

Referring now to Fig. 4, the apparatus of Fig. 1 is rotated 90° to show the catalyst reel and the prime mover thereof. In this figure, identical numeration has been used for the parts corresponding to Fig. 1. The catalyst reel 15 has the catalyst screen 18 in a rolled position thereon being actuated by prime mover 90 through a shaft 91 which moves in bearings 92 and 93. Prime mover 90 may suitably be an electric motor or other similar propulsion means.

It will be apparent that the present invention may be subject to wide variations. While the catalyst screen has been shown in a horizontal position in the several embodiments, it will be obvious to the skilled workman that the catalyst screen may be located vertically in a suitable reaction vessel and the reaction materials moved through the screen in any of several directions. It will also be obvious to the skilled workman that while the catalyst screen has been shown completely enclosed within a reaction vessel, only a part of it needs to be exposed to the reaction materials at one time. Thus, the screen could move in and through the reaction zone, the catalyst surface renewed and regenerated in a zone outside the reaction zone and the renewed and/or regenerated screen again moved through the reaction zone.

In the description taken with the drawing with particular reference to Fig. 3, the reaction products including unreacted material and volatilized catalyst are shown passing through a cooling zone wherein the temperature is lowered to cause deposition of catalyst on the catalyst screen 70. It will be apparent to the skilled workman that the cooling effect may be obtained by injecting a fluid into the stream flowing through line 81 at a temperature substantially lower than the reaction product mixture flowing therethrough. Such a fluid may include a gasiform material, such as a gas or vapor at a lower temperature than the reaction mixture, which is easily separable from the products. Water is an example of a fluid which may be injected either in a liquid or vaporous form. Other fluids, depending on the type of reaction taking place in reactor 77, may be used. For example, organic solvents such as alcohols, ketones, and the like and hydrocarbons may be used as the quenching medium.

The catalyst screen employed in the method of the present invention has been described as a metallic catalytic gauze or screen. In the cases where a catalytic material is deposited on the screen or gauze, it is to be understood that other material may be used besides metallic screens or gauze. For example, the gauze or screen may be constructed of woven glass fibers or woven asbestos fibers or other fibrous materials capable of withstanding the high temperatures prevailing in the reactor.

In the description of the several figures of the drawing it will be noted that the housings enclosing the supply and take-up reels provide free ingress of reaction materials to both the fresh and spent catalyst. This does not result in a detrimental effect since the temperature of the housings in which the reels of catalyst are located is substantially lower than the temperature in the reaction zone. Thus, if the fresh catalyst is exposed to reaction material, the temperature in the housing is not sufficiently high for a reaction to take place. However, to eliminate any possibility of a reaction taking place on exposure of fresh catalyst to any of the reactant stream which might diffuse into the housing by convection this may be prevented by flowing an inert gas into the housing and thence into the stream of reactants in the reactors. Such an inert gas may include carbon dioxide, nitrogen, and the like.

The several figures of the drawing show the screen of lesser width than the reactor. Therefore, it may be necessary to provide baffle plates or other means, not shown, in the reactor to direct all of the feed stream through the catalyst screen. These plates may be arranged in the reactor in substantially the same plane as the screen, or in a plane immediately below the screen.

The nature and objects of the present invention, having been fully described and illustrated, what I wish to claim as new and useful and to secure by Letters Patent is:

A continuous method for conducting a catalytic reaction which comprises continuously passing a stream of heated reactant material through a reaction zone, continuously moving into and through said reaction zone a metallic gauze having a volatilizable catalyst deposited thereon, the reaction conditions being such that a substantial portion of said catalyst volatilizes from the metallic gauze, continuously removing from the reaction zone metallic gauze denuded of catalyst and regenerating it by depositing additional volatilizable catalyst on such gauze while it is outside said reaction zone and subsequently passing the regenerated metallic gauze into and through said reaction zone in contact with said heated reactant material therein.

HENRY D. WILDE.

REFERENCES CITED

The following references are of record in the file of this patent:

UNITED STATES PATENTS

| Number | Name | Date |
| --- | --- | --- |
| 1,678,778 | Harter | July 31, 1928 |
| 2,389,378 | Marisic | Nov. 20, 1945 |
| 2,444,289 | Gorin et al. | June 29, 1948 |

FOREIGN PATENTS

| Number | Country | Date |
| --- | --- | --- |
| 647,038 | France | July 24, 1928 |

OTHER REFERENCES

Taylor, "Industrial and Engineering Chemistry," vol. 19, pp. 1250-1252, (1927).